United States Patent [19]

Shingai

[11] Patent Number: 5,096,674
[45] Date of Patent: Mar. 17, 1992

[54] ENDOTHERMIC REACTION APPARATUS

[75] Inventor: Hiroshi Shingai, Kanagawa, Japan

[73] Assignee: Fuji Electric Co., Ltd., Kanagawa, Japan

[21] Appl. No.: 322,466

[22] Filed: Mar. 13, 1989

[30] Foreign Application Priority Data

Mar. 22, 1988 [JP] Japan .................. 63-67721

[51] Int. Cl.$^5$ .............................................. F28D 7/12
[52] U.S. Cl. ................................... 422/204; 48/105; 48/215; 422/197; 422/202
[58] Field of Search ............... 422/202, 197, 196, 204, 422/198, 218; 165/141; 48/215, 105, 95; 122/4 R

[56] References Cited

U.S. PATENT DOCUMENTS

| | | | |
|---|---|---|---|
| 2,371,181 | 3/1945 | Newton | 422/218 X |
| 3,144,312 | 8/1964 | Mertens | 48/95 |
| 3,910,768 | 10/1975 | Woebcke et al. | 422/204 X |

*Primary Examiner*—Robert J. Warden
*Assistant Examiner*—Amalia L. Santiago
*Attorney, Agent, or Firm*—Finnegan, Henderson, Farabow, Garrett and Dunner

[57] ABSTRACT

An endothermic reaction apparatus for converting a raw gas, or a feed gas, into a reaction gas or a produced gas, under the influence of an endothermic reaction catalyst includes a reaction tube having a pair of inner and outer vertical tubular spaces which are separated by a vertical partition wall and communicate with each other at their lower ends. The endothermic reaction catalyst is disposed in the inner and outer tubular spaces to form a continuous catalyst structure. The catalyst structure has an inlet portion for introducing the raw gas into the catalyst structure and an outlet portion for discharging the reaction gas from the catalyst structure. The inlet and outlet portions of the catalyst structure are disposed generally at the same level. A burner is disposed inwardly of the inner tubular space for heating the catalyst structure. The reaction tube is received in a furnace container, and a combustion gas from the burner flows downwardly inwardly of that portion of the inner tubular space containing the catalyst and further flows upwardly outwardly of that portion of the outer tubular space containing the catalyst. A heat-insulating layer is mounted on the partition wall and disposed at least at that portion of the cylindrical partition wall disposed between the inlet and outlet portions of the catalyst structure.

7 Claims, 3 Drawing Sheets

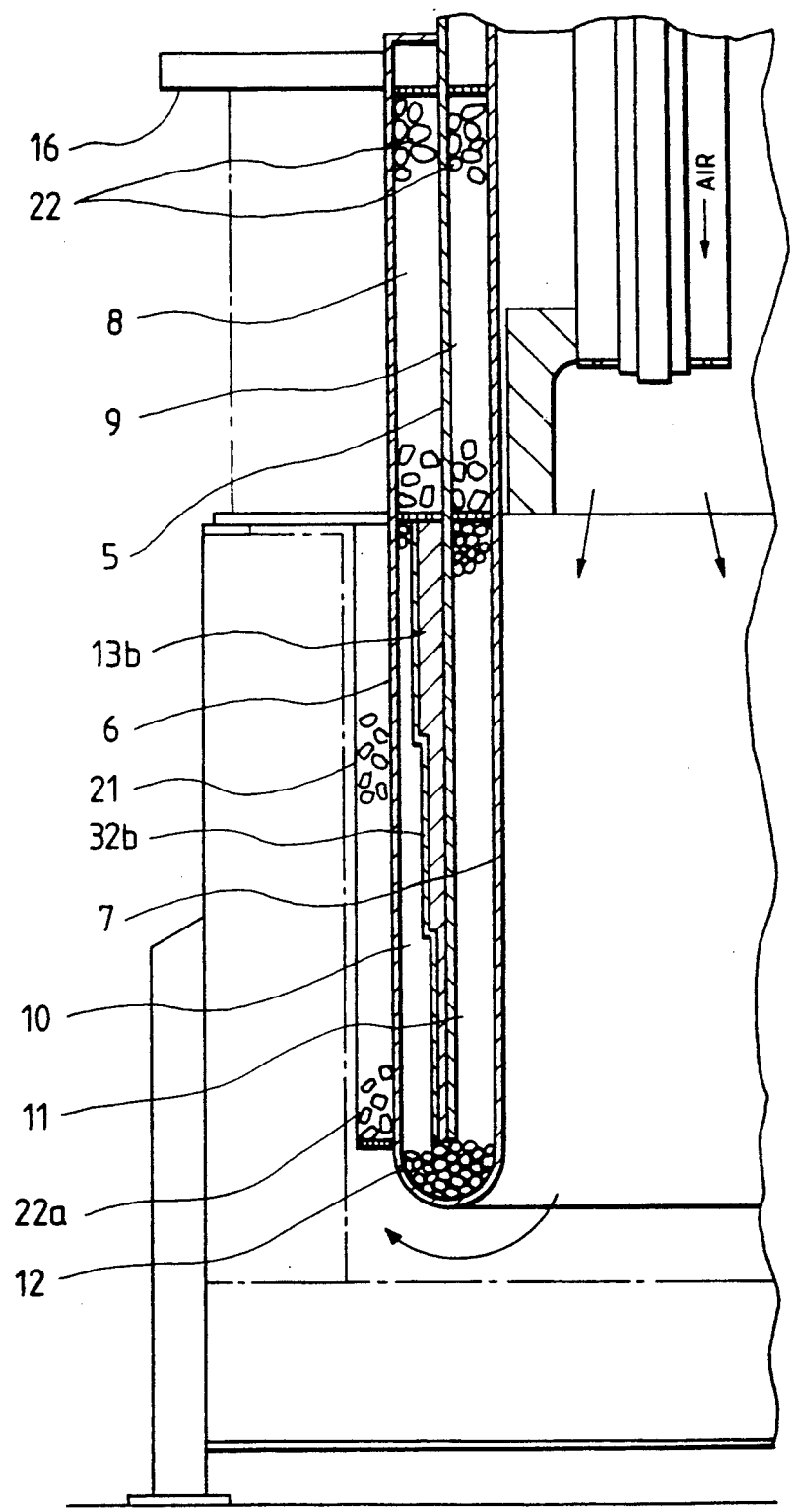

ENDOTHERMIC REACTION APPARATUS

FIELD OF THE INVENTION

This invention relates to an endothermic reaction apparatus for producing a reaction product gas from a raw or a feed gas in the presence of a catalyst. More specifically, this invention relates to such an endothermic reaction apparatus for use, for example, in a feed modifying apparatus for producing a hydrogen-rich gas to be used as a fuel for a feed cell.

BACKGROUND OF THE INVENTION

Conventionally, endothermic reaction apparatuses having a double-tube type construction have been used to modify a hydrocarbon, through reaction, to form a hydrogen-rich gas. Such a double-tube type apparatus, as disclosed in U.S. Pat. No. 3,144,312, has the following advantages: (1) The overall length of a reaction tube can be reduced since the endothermic reaction catalyst layer placed in the reaction tube is of a double, or folded, construction; (2) an improved efficiency is achieved because a combustion gas and the reaction gas can be caused to flow in opposite directions and because the temperature of the raw feed gas introduced into the catalyst layer can be increased through heat exchange between it and the heated reaction gas exiting the catalyst layer; and (3) the apparatus can be of a compact construction since a burner can be mounted inwardly of an inner tubular wall of the reaction tube.

In such a double-tube structure, an inlet and an outlet of the endothermic reaction catalyst layer through which the raw gas flows are disposed adjacent to each other and spaced apart by a cylindrical partition wall interposed therebetween. During the reaction, the temperature at the inlet of the catalyst layer is different from the temperature at the outlet, so that the heat is transferred from the side of a higher temperature to the side of a lower temperature through the partition tubular wall. This is disadvantageous in that the reaction fails to proceed smoothly. For example, when the properties of methane gas are to be modified by steam, the temperature at the inlet of the endothermic reaction catalyst layer is between 400° C. and 550° C. while the temperature at the outlet is between 650° C. and 800° C. Thus, a temperature difference of about 200° C. always exists between the inlet and the outlet, so that the heat is always transferred from the outlet to the inlet through the cylindrical partition wall. As a result, the amount of heat at the outlet of the catalyst layer becomes inadequate, so that the temperature of the catalyst layer can not be increased to a sufficient level. This is disadvantageous in that the reaction gas which has undergone insufficient reaction flows out of the catalyst layer.

SUMMARY OF THE INVENTION

It is therefore an object of this invention to provide an endothermic reaction apparatus which can keep an outlet of an endothermic reaction catalyst layer, filled in a double-tube structure, at a sufficiently high temperature so that a predetermined reaction can be carried out.

According to the present invention, there is provided an endothermic reaction apparatus comprising:

(a) a reaction tube comprising a vertical partition wall and a pair of inner and outer cylindrical vertical walls disposed on opposite sides of the partition wall and spaced apart from the partition wall to define a pair of inner and outer tubular spaces, the inner and outer walls being interconnected at their lower ends to define a lower end of the reaction tube, the partition wall terminating at its lower end short of the lower ends of the inner and outer cylindrical walls so that the inner and outer tubular spaces are in flow communication with each other, and the reaction tube having a raw gas inlet portion connected to an upper end of the outer tubular space so as to permit introduction of a raw gas thereinto, and a reaction gas outlet portion connected to an upper end of the inner tubular space so as to permit discharge of a reaction gas therefrom;

(b) an endothermic reaction catalyst disposed in the inner and outer tubular spaces to form a continuous catalyst structure, the catalyst structure having an inlet portion for introducing the raw gas into the catalyst structure and an outlet portion for discharging from the catalyst structure a reaction gas; the inlet portion and the outlet portions being disposed generally at the same level, (c) a burner disposed inwardly of the inner wall for heating the catalyst structure;

(d) a furnace container having a vertical axis and including a peripheral wall surrounding the outer wall in spaced relation thereto to form a first space therebetween, and a bottom wall spaced from the lower end of the reaction tube to form a second space therebetween, the burner being disposed at a level above the furnace container, and the inner wall, the second space and the first space jointly defining a combustion gas passage through which a combustion gas from the burner may flow; and (e) a heat-insulating layer mounted on the partition wall and disposed at least at that portion of the partition wall between the inlet and outlet portions of the catalyst structure.

The catalyst structure composed of the endothermic reaction catalyst is heated by the combustion gas from the burner, and the raw feed gas flowing through the catalyst structure is subjected to an endothermic reaction under the influence of the catalyst and is converted into the reaction, or product, gas. At this time, the combustion gas of higher temperature present mainly in the center of the furnace, near the inlet of the reactive tube, applies the heat to the reaction tube through radiation whereas the combustion gas of lower temperature present mainly around the outer periphery of the reaction tube applies the heat to the reaction tube through a convection. With respect to a temperature difference between the inner and outer catalyst layers disposed respectively in the inner and outer annular spaces in contiguous relation to each other, such temperature difference is greatest between the inlet and outlet portions of the catalyst structure during the endothermic reaction. However, the transfer of heat from the outlet portion to the inlet portion of the catalyst structure is reduced by virtue of the provision of the heat-insulating layer. Therefore, the temperature in the vicinity of the outlet portion of the catalyst structure can be kept at a sufficiently high level to complete the desired endothermic reaction.

BRIEF DESCRIPTION OF THE DRAWINGS

FIG. 3 is a view similar to FIG. 2 but showing another endothermic reaction apparatus in accordance with the present invention.

DESCRIPTION OF THE PREFERRED EMBODIMENTS OF THE INVENTION

The invention will now be described with reference to the drawings.

Figure 1:
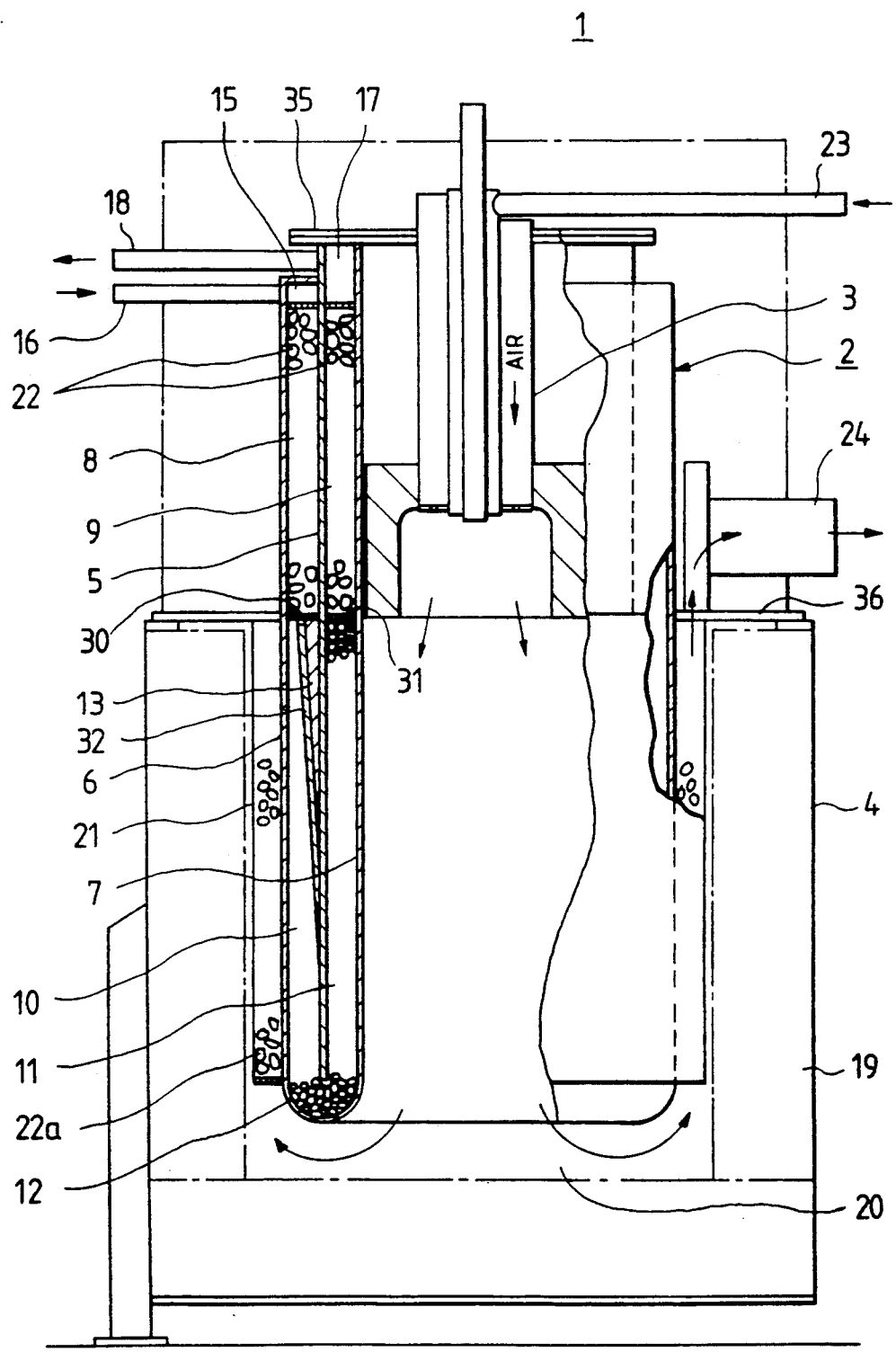
FIG. 1 is a partially cross-sectional, side-elevational view of one embodiment of an endothermic reaction apparatus in accordance with the present invention.

FIG. 1 shows an endothermic reaction apparatus of the present invention which comprises a plurality of spaced apart reaction tubes 2, a burner 3 disposed inwardly of the reaction tubes 2, and a furnace container 4 in which a catalyst-holding portion of the reaction tube 2 holding an endothermic reaction catalyst 12 is received, the furnace container having a vertical axis. The burner 3 is supported on the reaction tube 2 by a support member 35 mounted on the upper end of the reaction tube 2 the furnace container 4, the burner being disposed at a level above an upper open end of the furnace container 4. The reaction tube 2 is supported on the furnace container 4 through a support member 36.

While a plurality of reaction tubes 2, may be spaced around the furnace container, only one will be referred to in the following description. The reaction tube 2 comprises an outer vertical cylindrical wall 6, an inner vertical arcuate wall 7 spaced apart from and parallel to wall 6, in coaxially spaced relation thereto, and a vertical partition wall 5 across the tube 2 interposed between the outer and inner walls 6 and 7 and connected thereto to divide the interior of the reaction tube 2 into outer and inner tubular spaces 8 and 9. The outer and inner walls 6 and 7 are interconnected at their lower ends to define a cross-sectionally rounded or semi-circular lower end of the reaction tube 2. The partition wall 5 terminates at its lower end short of the lower end of the reaction tube 2 so that the outer and inner tubular spaces 8 and 9 communicate with each other at their lower ends to permit gas to flow from one space to the other.

The endothermic reaction catalyst 12 is filled in lower halves of the outer and inner tubular spaces 8 and 9 to form an outer catalyst layer 10 and an inner catalyst layer 11, respectively, the outer and inner catalyst layers 10 and 11 being connected together at the lower ends of the outer and inner tubular spaces 8 and 9 to form a continuous catalyst layer structure. Heat-conductive particles 22 are filled in the upper halves of the outer and inner tubular spaces 8 and 9 to form a heat exchange portion. The upper and lower halves of the outer tubular space 8 are separated from each other by a ring member 30, and similarly the upper and lower halves of the inner tubular space 9 are separated from each other by a ring member 31. The rings members 30 and 31 are of such a nature that they allows the passage of gas therethrough.

According to an important aspect of the present invention, a heat-insulating layer 13 of a heat-insulating material, such as ceramic fibers, is provided on the lower half portion of the cylindrical partition wall 5 separating the outer and inner catalyst layers 10 and 11 from each other. More specifically, a vertically extending wall 32 is interposed between the outer wall 6 and the partition wall 5 and extends downwardly from the level of the ring member 30. Wall 32 is spaced from the partition wall 5 with its upper end sloping inwardly toward its lower end, and terminates at its lower end short of the lower end of the partition wall 5. The heat-insulating layer 13 is filled in a space defined by the wall 32, the ring member 30 and the partition wall 5. Therefore, the heat-insulating layer 13 also decreased in thickness progressively toward its lower end. A raw gas flows through the outer and inner catalyst layers 10 and 11 in this order as hereinafter described. Thus, the thickness of the heat-insulating layer 13 is greatest at the inlet and outlet of the catalyst layer structure constituted by the outer and inner catalyst layers 10 and 11, these inlet and outlet being disposed adjacent to the ring members 30 and 31, respectively. The reason for this is that the greatest temperature difference due to the endothermic reaction develops between the inlet and outlet of the above catalyst layer structure. This temperature difference between the outer and inner catalyst layers 10 and 11 decreases progressively toward the lower ends thereof. This temperature difference is quite small at the lower portions of the outer and lower catalyst layers 10 and 11, and even if there is a small heat transfer between the two, this will not adversely affect the endothermic reaction. Therefore, the heat-insulating layer 13 is not provided at the lower end portion of the partition wall 5.

Heat-conductive particles 22 made, for example, of alumina are filled in the upper halves of the outer and inner tubular spaces 8 and 9 so as to promote a convective heat transfer effected therebetween through the partition wall 5. As later described, the raw gas flows into the upper half of the outer tubular space 8, and the reaction gas flows through the upper half of the inner annular space 9. Instead of the heat-conductive particles 22, fins may be formed on the upper half portion of the cylindrical partition wall 5 to promote heat transfer by convection.

The reaction tube 2 has at the upper end thereof a raw gas inlet portion 16 and a reaction gas outlet portion 18. The raw gas inlet portion 16 communicates with the upper end of the outer tubular space 8 through a gas manifold 15 so as to introduce the raw gas into the outer tubular space 8, and the upper end of the inner annular space 9 communicates with the reaction gas outlet portion 18 through a gas manifold 17 so as to discharge the reaction gas from the inner tubular space 9.

The burner 3, mounted inwardly of the reaction tube 2 and parallel thereto, has a discharge port disposed at a level substantially the same as those of the inlet and outlet of the catalyst layer structure constituted by the outer and inner catalyst layers 10 and 11 so that the combustion gas from the burner 3 heats the catalyst-holding portion of the reaction tube 2 holding these catalyst layers 10 and 11.

The catalyst-holding portion of the reaction tube 2 is received in the furnace container 4 above which the burner 3 is provided. An inner peripheral portion of the furnace container 4 as well as its inner bottom portion is made of a refractory, heat-insulating material 19. The combustion gas from the burner 3 flows downwardly through the central portion of the furnace container along the inner wall 7, and then is turned at the lower end of the reaction tube 2, and further flows upwardly along the outer wall 6 of the reaction tube 2. Thus, the inner wall 7 of the reaction tube 2, the space between the lower end of the reaction tube 2 and the bottom of the furnace container 4, and a space between the outer wall 6 and the inner periphery of the furnace container 4 jointly provide a combustion gas passage 20 for the passage of the combustion gas therethrough. A cylindrical wall 21 is disposed between the outer wall 6 and the furnace container 4, the cylindrical wall 21 being held at its entire outer periphery in contact with the inner periphery of the furnace container 4, defined by the above-mentioned refractory, heat-insulating material 19, and being radially outwardly spaced from the outer periphery of the outer wall 6 to form an annular space therebetween which serves as part of the combustion gas passage 20. Heat-conductive particles 22a for promoting a convective heat transfer are filled in this annular space. Instead of providing the cylindrical wall 21 and the heat-conductive particles 22a, fins may be formed on the outer periphery of the outer cylindrical wall 6.

The operation of the endothermic reaction apparatus of the above construction will now be described.

A fuel is supplied to the burner 3 through a fuel feed portion 23, and air for the combustion is fed into the burner 3 through an air feed portion (not shown), and the fuel is burned. As a result, the combustion gas from the burner 3 flows downwardly through the central portion of the furnace container 4 which is part of the combustion passage 20, and is turned at the lower end of the reaction tube 2, and further flows upwardly through the heat-conductive particles 22a, and is finally discharged from the endothermic apparatus through a combustion gas outlet 24.

The raw, or feed, gas is fed into the outer tubular space 8 through the raw gas inlet portion 16, so that the raw gas flows downwardly through the heat-conductive particles 22, filled in the upper half of the outer tubular space 8, and then through the outer catalyst layer 10 in the lower half of the outer tubular space 8. Then, the downwardly flowing raw gas is turned at the lower end of the reaction tube 2, and flows upwardly through the inner catalyst layer 11 in the lower half of the inner tubular space 9 and through the heat-conductive particles 22 in the upper half of the inner tubular space 9, and is finally discharged therefrom through the reaction gas outlet portion 18.

The catalyst layer structure constituted by the outer and inner catalyst layers 10 and 11 is heated by the combustion gas from the burner 3 are described above, and the raw gas, flowing through the catalyst layer structure in the direction opposite to the direction of flow of the combustion gas, is subjected to an endothermic reaction under the influence of the catalyst to be converted into the reaction product gas. At this time, heat from the hot combustion gas present mainly in the central portion of the furnace container 4 is transferred to the reaction tube 2 through radiation whereas the heat from the cooler combustion gas present mainly around the outer periphery of the reaction tube 2 is transferred to the reaction tube 2 through convection. With respect to the temperature differential between the outer and inner catalyst layers 10 and 11 disposed in contiguous relation to each other, such temperature difference is the greatest between the inlet and outlet of the catalyst layer structure, constituted by these layers 10 and 11, during the endothermic reaction. However, the transfer of heat from the outlet portion to the inlet portion of the catalyst layer structure is prevented by virtue of the provision of the heat-insulating layer 13. Therefore, the temperature in the vicinity of the outlet of the catalyst layer structure can be kept at a sufficiently high level to complete the endothermic reaction.

The raw gas flowing downwardly from the raw gas inlet portion 16 through the upper half of the outer tubular space 8 is heated by the heat applied through the partition wall 5 by the reaction product gas flowing upwardly from the inner catalyst layer 11 through the upper half of the inner tubular space 9. Thus, the heat is efficiently utilized through such heat exchange.

Figure 2:
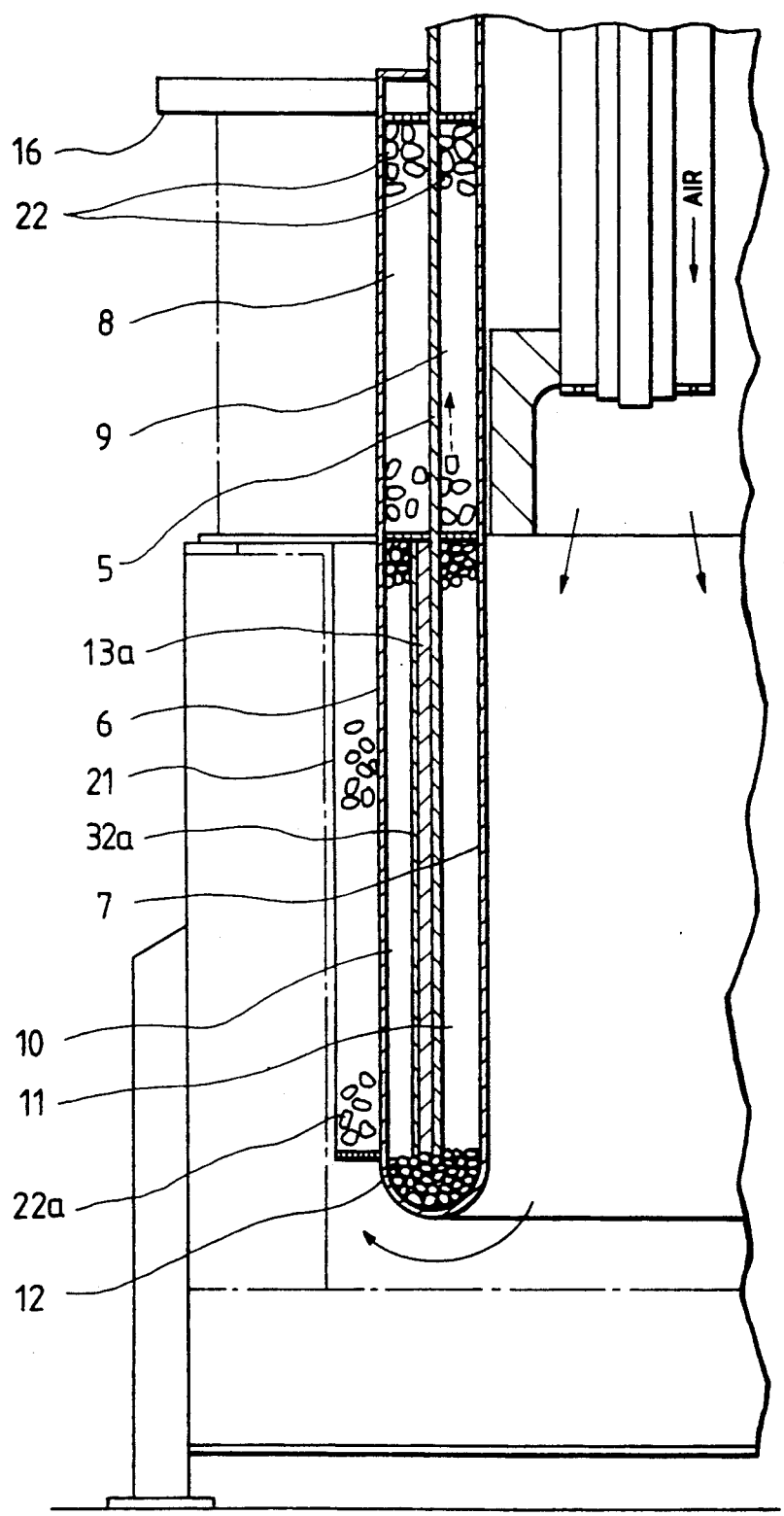
FIG. 2 is a fragmentary view of a second embodiment of an endothermic reaction apparatus in accordance with the present invention.

FIG. 2 shows a modified endothermic reaction apparatus which differs from the endothermic reaction apparatus of FIG. 1 only in that the heat-insulating layer 13a has a uniform thickness throughout the entire length thereof extending from its upper to lower end. Therefore, a wall 32a substantially parallel to the partition wall 5 extends from ring member 30 downwardly to the lower end of partition wall 5 for retaining the heat-insulating layer 13a in place.

FIG. 3 shows another modified endothermic reaction apparatus which differs from the endothermic reaction apparatus of FIG. 1 only in that the thickness of heat-insulating layer 13b is reduced toward its lower end in a stepped manner, and in that a wall 32b, also stepped accordingly, extends downwardly along partition wall 5 from the ring member 30 to the lower end of the partition wall 5.

Having described the preferred embodiments of the present invention, it is recognized that variations and modifications thereof falling within the spirit and scope of the invention may become apparent to one skilled in the art.

What is claimed is:

1. An endothermic reaction apparatus comprising:
 (a) a furnace container having a vertical peripheral wall with an upper end and lower end and a horizontal bottom wall across said lower end;
 (b) a burner positioned adjacent said upper end of said peripheral wall and spaced inwardly of said peripheral wall;
 (c) at least one elongated vertical reaction tube radially positioned between said peripheral wall and said burner and extending downwardly from said upper end of said peripheral wall toward said bottom wall, said reaction tube having an upper end and a closed lower end, and a vertical partition wall across said reaction tube and extending from the upper end thereof toward the lower end thereof so as to divide the interior of said reaction tube into an inner tubular space and an outer tubular space, said tubular spaces being in flow communication with each other adjacent the lower end of said reaction tube, a raw gas inlet means adjacent the upper end of said outer tubular space for introducing thereinto a raw gas and a reaction gas outlet means adjacent the upper end of said inner tubular space for removing reaction gas therefrom;
 (d) an endothermic reaction catalyst disposed in said inner and outer tubular spaces on each side of said partition wall to form a continuous catalyst structure having an inlet portion and an outlet portion; and
 (e) a heat-insulating layer mounted on said partition wall and extending along at least a portion of said partition wall between said inlet and outlet portion of said catalyst structure.

2. An endothermic reaction apparatus according to claim 1, in which said heat-insulating layer extends downwardly toward the lower end of said partition wall and terminates at its lower end short of the lower end of said partition wall.

3. An endothermic reaction apparatus comprising:
(a) a furnace container having a vertical peripheral wall with an upper end and lower end and a horizontal bottom wall across said lower end;
(b) a burner positioned adjacent said upper end of said peripheral wall and spaced inwardly of said peripheral wall;
(c) at least one elongated vertical reaction tube radially positioned between said peripheral wall and said burner and extending downwardly from said upper end of said peripheral wall toward said bottom wall, said reaction tube having an upper end and a closed lower end, and a vertical partition wall across said reaction tube and extending from the upper end thereof toward the lower end thereof so as to divide the interior of said reaction tube into an inner tubular space and an outer tubular space, said tubular spaces being in flow communication with each other adjacent the lower end of said reaction tube, a raw gas inlet means adjacent the upper end of said outer tubular space for introducing thereinto a raw gas and a reaction gas outlet means adjacent the upper end of said inner tubular space for removing reaction gas therefrom;
(d) an endothermic reaction catalyst disposed in said inner and outer tubular spaces on each side of said partition wall to form a continuous catalyst structure having an inlet portion and an outlet portion; and
(e) a heat-insulating layer mounted on said partition wall and extending along at least a portion of said partition wall between said inlet and outlet portion of said catalyst structure, said heat-insulating layer having a lower end and terminating short of the lower end of said partition wall and having a thickness which decreases progressively toward it lower end.

4. An endothermic reaction apparatus according to claim 2, in which said heat-insulating layer has a uniform thickness throughout the entire length thereof extending from its upper to its lower end.

5. An endothermic reaction apparatus according to claim 3, in which the thickness of said heat-insulating layer decreases towards its lower end in a stepped manner.

6. An endothermic reaction apparatus, according to claim 1, in which said endothermic reaction catalyst is disposed in lower portions of said inner and outer tubular spaces, and wherein said apparatus further contains heat-conductive particles disposed in upper portions of said inner and outer tubular spaces.

7. An endothermic reaction apparatus according to claim 1, wherein said apparatus further contains heat-conductive particles disposed in a space between said peripheral wall and said reaction tube.

* * * * *

UNITED STATES PATENT AND TRADEMARK OFFICE
CERTIFICATE OF CORRECTION

PATENT NO.   :   5,096,674
DATED        :   March 17, 1992
INVENTOR(S)  :   Hiroshi Shingai It is certified that error appears in the above-identified patent and that said Letters Patent is hereby corrected as shown below:

Claim 3, column 8, line 9, change "it" to --its--.

Signed and Sealed this

Second Day of November, 1993

Attest:

BRUCE LEHMAN

Attesting Officer

Commissioner of Patents and Trademarks